(12) United States Patent
DeLuca et al.

(10) Patent No.: US 9,460,473 B2
(45) Date of Patent: Oct. 4, 2016

(54) CONTENT-SENSITIVE NOTIFICATION ICONS

(75) Inventors: Lisa Seacat DeLuca, San Francisco, CA (US); Pamela A. Nesbitt, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 13/533,299

(22) Filed: Jun. 26, 2012

(65) Prior Publication Data

US 2013/0346515 A1 Dec. 26, 2013

(51) Int. Cl.
| | | |
|---|---|---|
| G06F 15/16 | (2006.01) |
| G06Q 50/00 | (2012.01) |
| G06Q 10/10 | (2012.01) |
| H04L 12/58 | (2006.01) |
| H04L 12/18 | (2006.01) |

(52) U.S. Cl.
CPC ............ *G06Q 50/01* (2013.01); *G06Q 10/107* (2013.01); *H04L 51/32* (2013.01); *H04L 12/1895* (2013.01)

(58) Field of Classification Search
CPC . H04L 12/58; G06F 17/2785; G06Q 10/107; H04H 60/33
USPC ........................................................ 709/206
See application file for complete search history.

(56) References Cited

U.S. PATENT DOCUMENTS

| | | | |
|---|---|---|---|
| 6,731,307 B1 * | 5/2004 | Strubbe et al. ................ 715/727 |
| 7,185,065 B1 * | 2/2007 | Holtzman et al. ............ 709/217 |
| 7,197,470 B1 * | 3/2007 | Arnett et al. ................. 705/7.29 |
| 7,720,784 B1 * | 5/2010 | Froloff ................... A61B 5/165 600/300 |
| 7,865,566 B2 * | 1/2011 | Ashtekar et al. ............. 709/207 |
| 7,908,554 B1 * | 3/2011 | Blattner ............... G06Q 10/107 715/706 |
| 7,921,369 B2 * | 4/2011 | Bill .............................. 715/753 |
| 8,041,669 B2 * | 10/2011 | Nigam et al. ................... 706/55 |
| 8,210,848 B1 * | 7/2012 | Beck et al. .................... 434/112 |
| 8,463,606 B2 * | 6/2013 | Scott et al. ................... 704/232 |
| 8,464,159 B2 * | 6/2013 | Refuah et al. ................ 715/744 |
| 8,767,948 B1 * | 7/2014 | Riahi et al. ............. 379/266.08 |
| 8,781,989 B2 * | 7/2014 | Duchon ......................... 706/52 |
| 9,042,923 B1 * | 5/2015 | Mirho .......................... 455/466 |
| 2002/0090935 A1 * | 7/2002 | Anzai ............... H04M 1/72552 455/412.1 |
| 2004/0225640 A1 * | 11/2004 | Brown et al. ..................... 707/3 |
| 2005/0116956 A1 * | 6/2005 | Beardow ....................... 345/473 |
| 2005/0223328 A1 * | 10/2005 | Ashtekar et al. ............. 715/706 |
| 2006/0084450 A1 * | 4/2006 | Dam Nielsen et al. ...... 455/466 |
| 2007/0050150 A1 * | 3/2007 | Levy et al. ..................... 702/19 |
| 2007/0061735 A1 * | 3/2007 | Hoffberg et al. ............. 715/744 |

(Continued)

OTHER PUBLICATIONS

Motorola, "Message Preview through Status Icons", IP.com, IPCOM000007848D, Nov. 1, 1996, Mototola.

*Primary Examiner* — Kevin Bates
*Assistant Examiner* — Clarence McCray
(74) *Attorney, Agent, or Firm* — Jordan IP Law, LLC

(57) ABSTRACT

Methods and systems may provide for receiving a message, determining a mood condition for the message, and generating a message notification icon based on the mood condition. In one example, the mood condition estimates one or more of a mood of the sender of the message and a mood impact of the message on a recipient of the message. Moreover, one or more additional messages may be received, wherein one or more additional mood conditions are determined for the additional messages, and the mood conditions are combined to form an aggregate mood condition. The message notification icon may be further generated based on the aggregate mood condition.

17 Claims, 4 Drawing Sheets

(56) References Cited

U.S. PATENT DOCUMENTS

| | | | |
|---|---|---|---|
| 2007/0089125 A1* | 4/2007 | Claassen | H04H 60/33 725/9 |
| 2008/0153554 A1* | 6/2008 | Yoon | H04M 1/72547 455/567 |
| 2008/0201664 A1* | 8/2008 | O | 715/835 |
| 2008/0294741 A1* | 11/2008 | Dos Santos | G06Q 10/107 709/206 |
| 2009/0016617 A1* | 1/2009 | Bregman-Amitai | G06K 9/00281 382/229 |
| 2009/0055484 A1* | 2/2009 | Vuong | G06Q 10/107 709/206 |
| 2009/0147008 A1* | 6/2009 | Do | A63F 13/12 345/473 |
| 2010/0082751 A1* | 4/2010 | Meijer et al. | 709/206 |
| 2010/0144426 A1* | 6/2010 | Winner et al. | 463/25 |
| 2010/0151889 A1* | 6/2010 | Chen | G06F 17/30976 455/466 |
| 2010/0205541 A1* | 8/2010 | Rapaport et al. | 715/753 |
| 2011/0264453 A1* | 10/2011 | Brokken et al. | 704/278 |
| 2011/0320543 A1* | 12/2011 | Bendel et al. | 709/206 |
| 2012/0158989 A1* | 6/2012 | Patil et al. | 709/235 |
| 2012/0226112 A1* | 9/2012 | LeBoeuf et al. | 600/301 |
| 2012/0246054 A1* | 9/2012 | Sastri | 705/37 |
| 2012/0290521 A1* | 11/2012 | Frank et al. | 706/45 |
| 2013/0103624 A1* | 4/2013 | Thieberger | 706/12 |
| 2013/0110565 A1* | 5/2013 | Means et al. | 705/7.11 |
| 2013/0246053 A1* | 9/2013 | Scott et al. | 704/201 |
| 2013/0298044 A1* | 11/2013 | Bill | 715/753 |
| 2013/0311270 A1* | 11/2013 | Daftary et al. | 705/14.43 |
| 2013/0325437 A1* | 12/2013 | Lehman et al. | 704/9 |
| 2013/0346067 A1* | 12/2013 | Bhatt | 704/9 |
| 2013/0346515 A1* | 12/2013 | DeLuca et al. | 709/206 |
| 2014/0088954 A1* | 3/2014 | Shirzadi | G06F 17/24 704/9 |
| 2014/0136182 A1* | 5/2014 | Bill | 704/2 |
| 2014/0223462 A1* | 8/2014 | Aimone et al. | 725/10 |
| 2014/0280529 A1* | 9/2014 | Davis et al. | 709/204 |
| 2014/0376543 A1* | 12/2014 | Malatack et al. | 370/352 |
| 2014/0379328 A1* | 12/2014 | Kim | G06F 17/276 704/9 |
| 2015/0058273 A1* | 2/2015 | Coden | G06F 21/32 706/52 |
| 2015/0180746 A1* | 6/2015 | Day, II | H04L 51/16 455/405 |
| 2015/0295867 A1* | 10/2015 | DeLuca | H04L 51/32 709/206 |

* cited by examiner

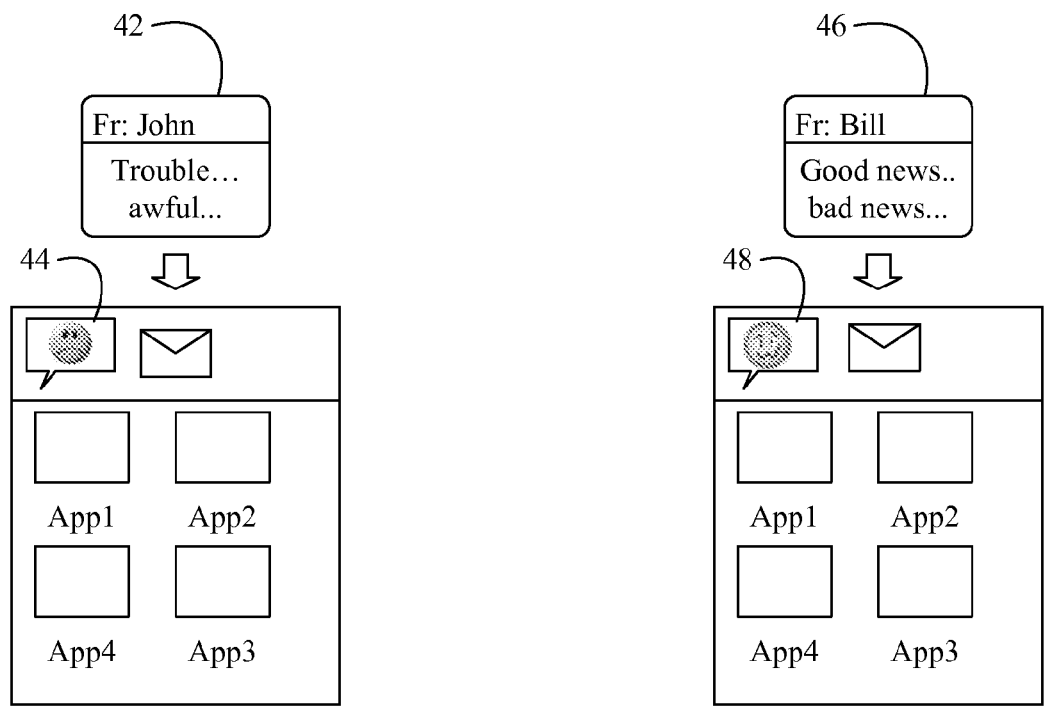
FIG. 5
FIG. 6
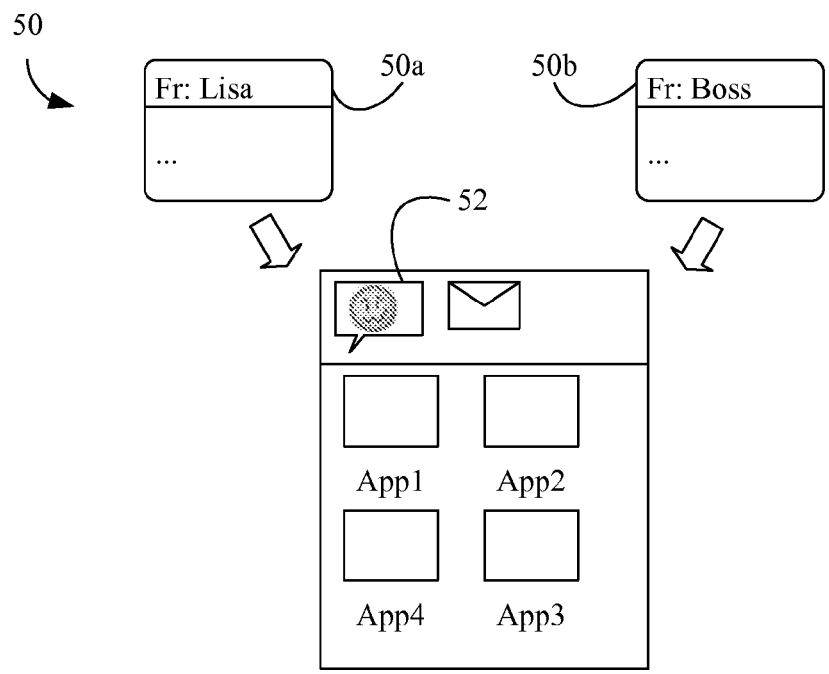
FIG. 7 ered thereon.

CONTENT-SENSITIVE NOTIFICATION ICONS

BACKGROUND

Embodiments of the present invention generally relate to new message notifications. More particularly, embodiments relate to the use of mood conditions to generate content-sensitive notification icons.

Handheld devices such as smart phones may be used to send and receive text messages, wherein the arrival of a new text message may be brought to the attention of the device user by displaying a notification icon on a screen of the device. The user's decision of whether and when to read new text messages can be difficult, however, due to the limited amount of information that may be conveyed through conventional notification icons. Such difficulties can be even more prevalent for users who receive a high volume of messages.

BRIEF SUMMARY

Embodiments may include a computer program product having a computer readable storage medium and computer usable code stored on the computer readable storage medium. If executed by a processor, the computer usable code may cause a computer to receive a first message and determine a first mood condition for the first message. The computer usable code, if executed, can further cause a computer to generate a message notification icon based on the first mood condition.

Embodiments can also include a computer implemented method in which a first message is received, wherein the method may identify a sender of the first message and one or more words in the first message. The method can further provide for determining a first mood condition for the first message based on at least one of the sender and the one or more words in the first message, wherein the first mood condition estimates one or more of a mood of the sender of the first message and a mood impact of the first message on a recipient of the first message. Additionally, one or more additional messages may be received. The method may also involve determining one or more additional mood conditions for the one or more additional messages, combining the first mood condition of the first message with the one or more additional mood conditions to form an aggregate mood condition. Moreover, the method can provide for generating a message notification icon based on the aggregate mood condition.

Embodiments may include a computer program product having a computer readable storage medium and computer usable code stored on the computer readable storage medium. If executed by a processor, the computer usable code may cause a computer to receive a first message, and identify a sender of the first message and one or more words in the first message. Additionally, the computer usable code, if executed, can cause a computer to determine a first mood condition for the first message based on at least one of the sender and the one or more words in the first message, wherein the first mood condition is to estimate one or more of a mood of the sender of the first message and a mood impact of the first message on a recipient of the first message. Moreover, the computer usable code, if executed, may cause a computer to receive one or more additional messages, determine one or more additional mood conditions for the one or more additional messages, combine the first mood condition of the first message with the one or more additional mood conditions to form an aggregate mood condition, and generate a message notification icon based on the aggregate mood condition.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIG. 5 is a block diagram of an example of a negative mood notification icon that is generated based on one or more words in a message according to an embodiment;

FIG. 6 is a block diagram of an example of a combined mood notification icon that is generated based a plurality of words associated with different mood conditions according to an embodiment;

FIG. 7 is a block diagram of an example of a combined mood notification icon that is generated based on multiple messages from different senders according to an embodiment;

DETAILED DESCRIPTION

Figure 1:
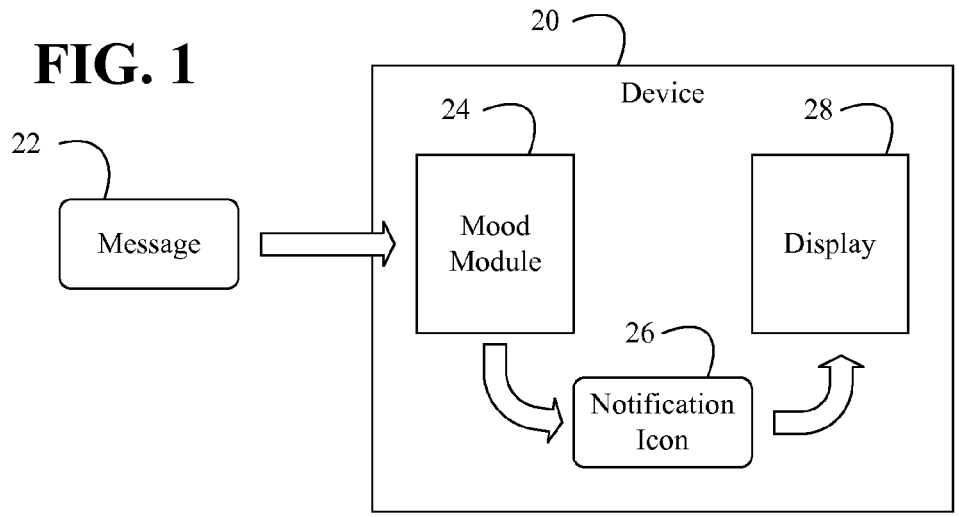
FIG. 1 is a block diagram of an example of a notification icon generation scheme according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a system/device 20 is shown, wherein the device 20 receives a message 22 such as a text message (short messaging service/SMS message), instant message (IM), electronic mail (email), voice transcript, social networking wall post, and so forth. In the illustrated example, the device 20 includes a mood module 24 that determines a mood condition for the message 22 and generates a message notification icon 26 based on the mood condition. The message notification icon 26 may then be presented to a recipient/user of the device 20 via a display/screen 28 or other suitable user interface component. As will be discussed in greater detail, the mood condition may generally enable the user to better determine whether and when to read the message 22.

More particularly, the mood condition might estimate a mood of a sender of the message 22, wherein the recipient could decide to wait to open the message 22 until later if the notification icon 26 reflects a relatively bad mood on the part of the sender (e.g., if the recipient does not feel like dealing with bad news at the time of receipt) and immediately open the message 22 if the notification icon 26 reflects a relatively good mood on the part of the sender (e.g., if the recipient needs "cheering up"). Alternatively, the recipient could decide to immediately open the message 22 if the notification icon 26 reflects a relatively bad mood on the part of the sender (e.g., if the recipient is in "crisis management mode") and wait to open the message 22 until later if the notification icon 26 reflects a relatively good mood on the part of the sender (e.g., if the recipient is busy with other tasks). In one example, the mood of the sender of the message 22 is determined based on the content of the message 22, wherein a semantic/sentiment analysis and/or predetermined word-mood relationship may be applied to the content of the message 22 in order to estimate the mood of the sender.

The mood condition may also estimate a mood impact of the message 22 on the recipient of the message 22. In such a case, the recipient could decide to wait to open the message 22 until later if the notification icon 26 reflects that the message 22 is likely to place the recipient in a bad mood (e.g., if the recipient does not feel like dealing with bad news) and immediately open the message 22 if the notification icon 26 reflects that the message 22 is likely to place the recipient in a good mood (e.g., if the recipient needs cheering up). In one example, the mood impact of the message 22 on the recipient is determined based on the content of the message 22, the identity of the sender of the message 22, or any combination thereof. Thus, a semantic analysis could be applied to the content of the message 22 in order to estimate the mood impact of the message 22 on the recipient. Additionally, a predetermined sender-mood relationship could be applied to the sender in order to estimate the mood impact of the message 22 on the recipient.

As will be discussed in greater detail, the notification icon 26 may also be used to convey the mood condition of multiple unread messages. For example, respective mood conditions for messages from different senders can be combined to form an aggregate mood condition that reflects the overall mood of a group. Similarly, respective mood conditions for multiple messages from the same sender can be combined to form an aggregate mood condition of the sender. Moreover, the notification icon 26 may even be modified according to mood condition over time as new messages are received from either different senders or the same sender. In one example, the different senders are members of a user defined group such as, for example, college classmates, family, debate team, etc.

Figure 2:
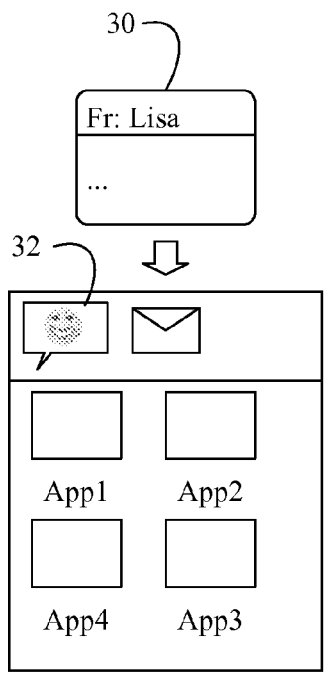
FIG. 2 is a block diagram of an example of a positive mood notification icon that is generated based on a sender of a message according to an embodiment.
Figure 3:
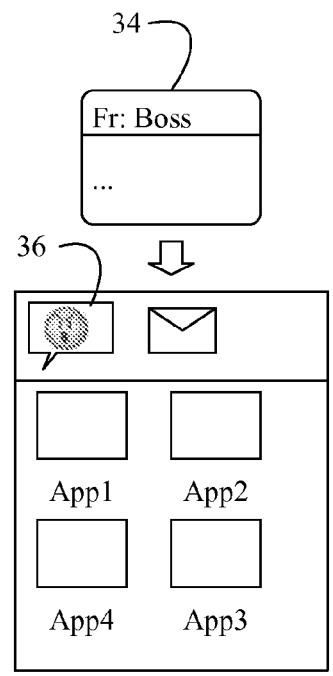
FIG. 3 is a block diagram of an example of a negative mood notification icon that is generated based on a sender of a message according to an embodiment.

FIG. 2 shows a scenario in which a text message 30 from a particular sender ("Lisa") is used to generate a notification icon 32. In the illustrated example, a predetermined sender-mood relationship (e.g., user defined) has been established for Lisa so that a generally positive mood condition is associated with that user. In other words, the user may predetermine that he or she generally feels positively towards Lisa. Accordingly, the notification icon 32 may include a "smile" emoticon to convey the positive mood condition associated with Lisa. By contrast, FIG. 3 shows a scenario in which a text message 30 from another user ("Boss") is used to generate a notification icon 36. In the illustrated example, a generally negative (e.g., confrontational) mood condition has been associated with Boss so that the notification icon 36 may include an "angry" emoticon to convey the confrontational mood condition. Other indicators such as colors, images, sounds, smells, etc., may be used to convey different moods/emotions.

Figure 4:
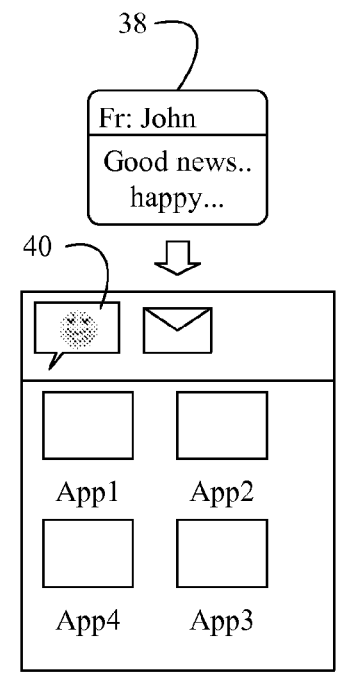
FIG. 4 is a block diagram of an example of a positive mood notification icon that is generated based on one or more words in a message according to an embodiment.

Turning now to FIG. 4 shows a scenario in which the content of a text message 38 is used to generate a notification icon 40. In the illustrated example, a semantic analysis might be used to identify terms such as "Good news" and "happy" as being indicative of a positive mood condition with respect to the sender's mood and/or the mood impact of the message 38 on the recipient. Additionally, a predetermined word-mood relationship (e.g., user defined) could be used to identify those terms as being indicative of a positive mood condition. Accordingly, the notification icon 40 may be configured to contain a smile emoticon. By contrast, FIG. 5 shows another scenario in which the content of a text message 42 is used to generate a notification icon 44. In the illustrated example, a generally negative mood condition has been estimated due to the words "Trouble" and "awful" being detected in the message 42, wherein a semantic analysis and/or predetermined word-mood relationship may be used to make the mood condition determination, as already discussed.

FIG. 6 shows yet another scenario in which the content of a text message 46 is used to generate a notification icon 48. In the illustrated example, a plurality of terms/words in the message 46 are associated with different mood conditions (e.g., "Good news" may be associated with a positive mood, whereas "bad news" may be associated with a negative mood). Accordingly, the different mood conditions may be combined to generate the notification icon 48, which contains a "confused" emoticon in the example shown to convey to the recipient that the message 46 may correspond to both positive and negative moods.

Turning now to FIG. 7, a scenario is shown in which a plurality of messages 50 (50a-50b) are received from different senders ("Lisa" and "Boss"), wherein the senders are associated with different mood conditions (e.g., Lisa may be associated with a positive mood condition, whereas Boss may be associated with a confrontational mood condition). In such a case, the different mood conditions of the messages 50 may be combined to form an aggregate mood condition, wherein a notification icon 52 may be generated based on the aggregate mood condition. In the illustrated example, the notification icon 52 contains a confused emoticon in order to convey to the recipient that the messages 50 may correspond to both positive and negative moods. The aggregate mood condition could also be weighted so that a particularly strong mood (e.g., from a certain sender) might outweigh other moods to be reflected in the aggregate, wherein the weighting can be configured by the recipient in a user profile (e.g., along with other predetermined sender-mood and word-mood relationships). Similarly, the aggregation might take into consideration the number of messages received having each mood in the aggregate. As already noted, the different senders could also be members of a user defined group so that the user may track the collective mood of sets of individuals within specific social circles.

Figure 8:
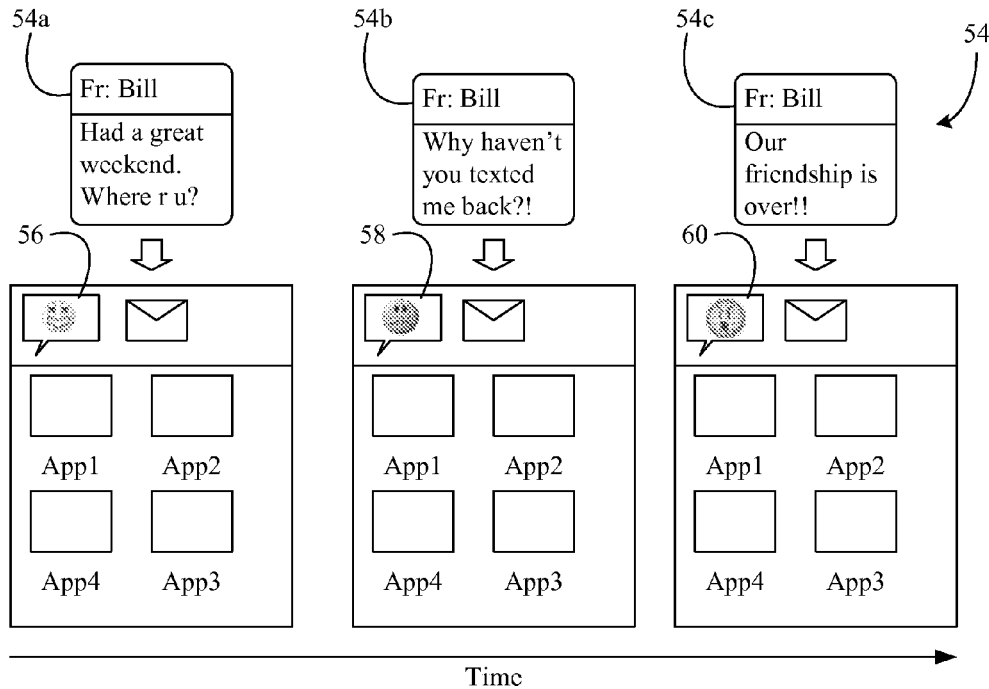
FIG. 8 is a block diagram of an example of a modification of a notification icon over time as new messages are received from a sender according to an embodiment.

FIG. 8 shows a scenario in which a plurality of messages 54 (54a-54c) are received from the same user ("Bill") over time. In the illustrated example, a notification icon 56, 58, 60 is modified (e.g., "morphs") according to mood condition over time as the messages 54 are received. In particular, it may be determined based on the content of a first message 54a (e.g., using semantic analysis and/or predetermined word-mood relationships) that either the sender of the message 54a is in a relatively good mood or that the message 54a is likely to place the recipient of the message 54a in a relatively good mood. Accordingly, the illustrated notification icon 56 is configured to contain a smile emoticon. The content of a second message 54b, however, may indicate that either the sender of the message 54b is in a bad mood or that the message 54b is likely to place the recipient of the message 54b in bad mood. Accordingly, the illustrated notification icon 58 is modified to contain a "frown" emoticon in order to reflect the change in mood. Moreover, the content of a third message 54c might indicate that either the sender of the message 54c is in a confrontational mood or that the message 54c is likely to place the recipient of the message in a confrontational mood. Accordingly, the illustrated notification icon 60 is modified to contain an angry emoticon in order to reflect the additional change in mood. Thus, the recipient may be able to use the notification icons 56, 58, 60 as a message based "mood ring", wherein a single icon might reflect a wide variety of moods and/or emotions over a range of time.

Figure 9:
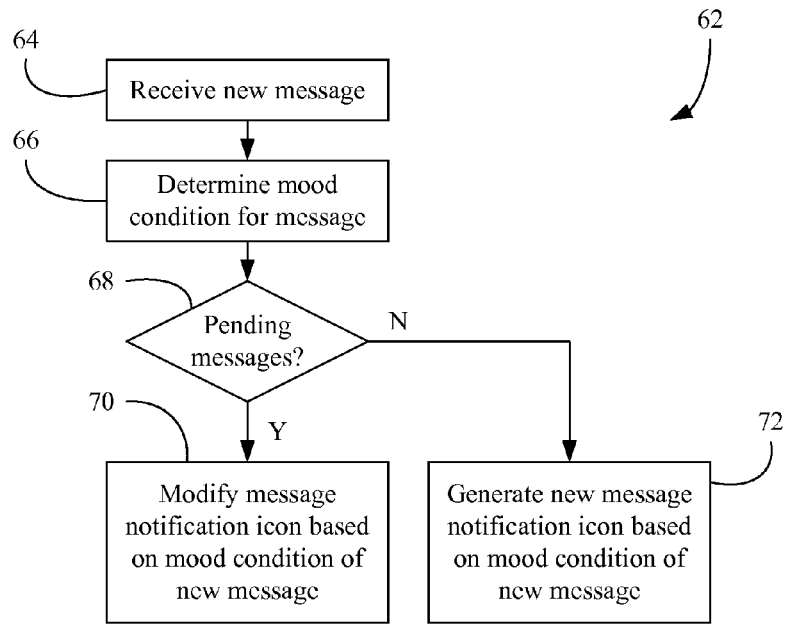
FIG. 9 is a flowchart of an example of a method of generating content-sensitive notification icons according to an embodiment.

FIG. 9 shows a method 62 of generating content-sensitive notification icons. The method 62 may be implemented in an application such as, for example, a text messaging, instant messaging, social networking or email messaging application, wherein the application might be executed on a desktop computer, notebook computer, smart tablet, and so forth. Illustrated processing block 64 provides for receiving a new message, wherein a mood condition may be determined for the message at block 66. As already noted, the mood condition could estimate the mood of the sender of the message, the mood impact of the message on the recipient of the message, and so forth. A determination may be made at block 68 as to whether any pending/unread messages are already present. If so, a pre-existing message notification icon can be modified at block 70 based on the mood condition of the new message. Otherwise, illustrated block 72 provides for generating a new message notification icon based on the mood condition of the new message.

Figure 10:
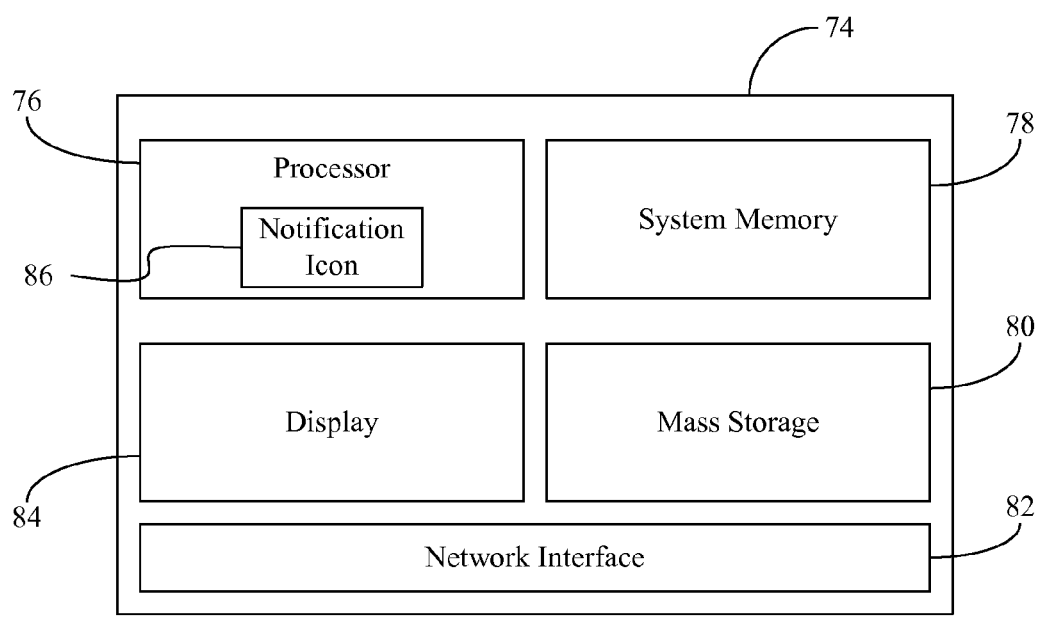
FIG. 10 is a block diagram of an example of a computing system according to an embodiment.

FIG. 10 shows a computing system 74 that may be used to generate content-sensitive message notification icons. The illustrated system 74 includes a processor 76, system memory 78 (e.g., volatile memory), mass storage 80 (e.g., non-volatile memory/NVM), a network interface 82, and a display 84. The processor 76 may execute notification icon logic 86 that is configured to receive messages via the network interface 82, determine mood conditions for the messages, and generate message notification icons based on the mood conditions, wherein the message notification icons can be output to the display 84 for viewing by the message recipient, as already discussed. In one example, the mood conditions estimate one or more of the moods of the senders of the messages and the mood impacts of the messages on the recipient of the messages.

Techniques described herein may therefore enable message recipients to determine whether and when to read new messages based on mood. Additionally, message notification icons can "morph" over time based on mood changes with respect to a single sender or a group of users. Indeed, specific groups might be defined from a recipient's contacts in order to enable the user to gauge the emotional state of various classes of individuals in the recipient's social network. These techniques may be particularly advantageous in cases where a large number of messages are received.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:
receiving, by a circuit that is in communication with a remote server via a network, a first message from a sender, wherein the message is an electronic message that is transmitted over the network;
identifying, by a circuit, one or more words in the first message;
applying, by a circuit, at a recipient-side one or more of a semantic analysis and a predetermined word-mood relationship to the one or more words in the first message to determine a first mood condition;
identifying, by a circuit, the sender of the first message;
applying, by a circuit, a predetermined recipient-defined sender-mood relationship to the sender to further determine the first mood condition, wherein the first mood condition is utilized at the recipient-side and estimates a mood of the sender of the first message and a mood impact of the first message on the recipient of the first message;
generating, by a circuit, a message notification icon with respect to the first message at the recipient-side based on the first mood condition and providing said message notification icon to the recipient on the recipient-side; and
modifying the message notification icon of the first message according to mood condition over time as new messages are received.

2. The method of claim 1, further including:
receiving one or more additional messages;
determining one or more additional mood conditions for the one or more additional messages; and
combining the first mood condition of the first message with the one or more additional mood conditions to form an aggregate mood condition, wherein the message notification icon is generated based on the aggregate mood condition, and wherein the first message and the one or more additional messages include one of text messages, emails, instant messages, wall posts and voice transcripts.

3. The method of claim 2, wherein the first message and at least one of the one or more additional messages originate from different senders, and the different senders are members of a user defined group.

4. The method of claim 1, wherein the first message and the one or more additional messages originate from a same sender.

5. The method of claim 1, further including:
identifying a plurality of words in the first message, wherein the plurality of words are associated with different mood conditions, and wherein the first mood condition represents a combination of the different mood conditions into the first mood condition.

6. A computer program product comprising:
a non-transitory computer readable storage medium; and
computer usable code stored on the computer readable storage medium, where, if executed by a processor, the computer usable code causes a computer to:
receive, by a circuit, a first message from a sender, wherein the message is an electronic message;
identify, by a circuit, one or more words in the first message; apply, by a circuit, at a recipient-side one or more of a semantic analysis and a predetermined word-mood relationship to the one or more words in the first message to determine a first mood condition;
identify, by a circuit, the sender of the first message;
apply, by a circuit, a predetermined recipient-defined sender-mood relationship to the sender to further determine the first mood condition, wherein the first mood condition is utilized at the recipient-side and is to estimate a mood of the sender of the first message and a mood impact & the first message on the recipient & the first message; and
generate, by a circuit, a message notification icon with respect to the first message at the recipient-side based on the first mood condition and providing said message notification icon to the recipient on the recipient-side, and
modify the message notification icon of the first message according to mood condition over time as new messages are received.

7. The computer program product of claim 6, wherein the computer usable code, if executed, causes a computer to:
receive one or more additional messages;

determine one or more additional mood conditions for the one or more additional messages; and generate an aggregate mood condition, wherein the message notification icon is to be generated based on the aggregate mood condition, and wherein the first message and the one or more additional messages are to include one of text messages, emails, instant messages, wall posts and voice transcripts.

8. The computer program product of claim 7, wherein the first message and at least one of the one or more additional messages are to originate from different senders, and the different senders are to be members of a user defined group.

9. The computer program product of claim 6, wherein the first message and the one or more additional messages are to originate from a same sender.

10. The computer program product of claim 6, wherein the computer usable code, if executed, causes a computer to:
identify a plurality of words in the first message, wherein the plurality of words are to be associated with different mood conditions, and
wherein the first mood condition is to represent a combination of the different mood conditions.

11. A computer program product comprising:
a non-transitory computer readable storage medium; and
computer usable code stored on the computer readable storage medium, where, if executed by a processor, the computer usable code causes a computer to:
receive, by a circuit, a first message from a sender, wherein the message is an electronic message;
determine, by a circuit, at a recipient-side, a first mood condition for the first message that is to estimate a mood impact of the first message on the recipient of the first message;
apply, by a circuit, a predetermined recipient-defined sender-mood relationship to the sender at the recipient-side;
generate, by a circuit, a message notification icon with respect to the first message at the recipient-side based on the first mood condition and provide said message notification icon to the recipient on the recipient-side, and modify the message notification icon of the first message according to mood condition over time as new messages are received.

12. The computer program product of claim 11, wherein the computer usable code, if executed, causes a computer to:
receive one or more additional messages;
determine one or more additional mood conditions for the one or more additional messages; and
combine the first mood condition of the first message with the one or more additional mood conditions to form an aggregate mood condition, wherein the message notification icon is to be generated based on the aggregate mood condition.

13. The computer program product of claim 12, wherein the first message and at least one of the one or more additional messages are to originate from different senders, and the different senders are to be members of a user defined group.

14. The computer program product of claim 12, wherein the first message and the one or more additional messages are to originate from a same sender.

15. The computer program product of claim 11, wherein the first mood condition is to estimate one or more of a mood of a sender of the first message and a mood impact of the first message on a recipient of the first message.

16. The computer program product of claim 11, wherein the computer usable code, if executed, causes a computer to:
identify one or more words in the first message; and
apply one or more of a semantic analysis and a predetermined word-mood relationship to the one or more words in the first message to determine the first mood condition.

17. The computer program product of claim 11, wherein the computer usable code, if executed, causes a computer to:
identify a plurality of words in the first message, wherein the plurality of words are to be associated with different mood conditions, and
wherein the first mood condition is to represent a combination of the different mood conditions.

* * * * *